(12) United States Patent
Gussen et al.

(10) Patent No.: US 10,029,535 B2
(45) Date of Patent: Jul. 24, 2018

(54) SUSPENSION SYSTEM WEAR EXTENT ESTIMATION

(71) Applicant: FORD GLOBAL TECHNOLOGIES, LLC, Dearborn, MI (US)

(72) Inventors: Uwe Gussen, Huertgenwald (DE); Christoph Arndt, Moerlen Rheinland-Pfalz (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/160,889

(22) Filed: May 20, 2016

(65) Prior Publication Data
US 2016/0339757 A1 Nov. 24, 2016

(30) Foreign Application Priority Data
May 22, 2015 (IN) .......................... 2584/CHE/2015

(51) Int. Cl.
*B60G 17/00* (2006.01)
*G07C 5/00* (2006.01)
*B60G 17/0185* (2006.01)
*G07C 5/08* (2006.01)

(52) U.S. Cl.
CPC ....... *B60G 17/0185* (2013.01); *G07C 5/0816* (2013.01); *B60G 2800/80* (2013.01); *B60G 2800/802* (2013.01)

(58) Field of Classification Search
CPC ........ B60G 13/00; B60G 13/02; B60G 17/00; G07C 5/00
See application file for complete search history.

(56) References Cited

U.S. PATENT DOCUMENTS

| 6,873,890 | B2 | 3/2005 | Song |
| 7,941,256 | B2 | 5/2011 | Namuduri et al. |
| 9,428,022 | B2* | 8/2016 | Coombs ................. B60G 11/27 |
| 2008/0039994 | A1* | 2/2008 | Mannerfelt ........... G01M 17/04 701/33.9 |
| 2014/0060715 | A1 | 3/2014 | Winshtein et al. |
| 2015/0224845 | A1* | 8/2015 | Anderson ............ B60G 17/019 701/37 |

FOREIGN PATENT DOCUMENTS

| EP | 2469120 A2 | 6/2012 |
| EP | 2567839 A2 | 3/2013 |

* cited by examiner

*Primary Examiner* — Yonel Beaulieu
(74) *Attorney, Agent, or Firm* — Frank A. MacKenzie; Brooks Kushman P.C.

(57) ABSTRACT

The present subject matter relates to a method for estimating extent of wear of a suspension system in a vehicle using a computing device. The baseline operational parameters of the suspension system are received, and motion parameters of vehicle are detected. Actual operational parameters of the suspension system are estimated based on the detected motion parameters. An alert to indicate the extent of wear of the suspension system is generated based on determining a deviation of the actual operational parameters from the actual operational parameters.

16 Claims, 2 Drawing Sheets

SUSPENSION SYSTEM WEAR EXTENT ESTIMATION

CROSS-REFERENCE TO RELATED APPLICATION

This application claims foreign priority benefits under 35 U.S.C. § 119(a)-(d) to IN 2584/CHE/2015, filed May 22, 2015, which is hereby incorporated by reference in its entirety.

TECHNICAL FIELD

Vehicles may be provided with a suspension system which protects the wheel mounting from shock that may be experienced as the vehicle is being driven across a road. In general, components of suspension system may undergo normal wear, which may necessitate repairs if the damage to the suspension system exceeds a predefined extent. In such circumstances, users of the vehicles may be generally unaware of the extent of wear and damage to the suspension system. The user may only realize the extent of the damage to the suspension system when the entire system suffers complete and irreparable damage. As a result, the entire suspension system may have to be replaced. Such situation may be averted if the suspension system is periodically checked and serviced, to repair and correct any damage which may have occurred due to the wear. Such checking and servicing has to be actively scheduled by the user.

BACKGROUND

Typically, vehicles may be provided with sensor-based systems which regularly monitor the condition of the suspension system. One such system is described in European patent publication EP 2469120 A2 ('120 application). The '120 application describes a suspension adjustment system, which has a sensor which is in communication with a processor. The sensor measures an operational characteristic of a gas spring. The processor is configured to suggest an operational setting of the gas spring in response to an input from the sensor corresponding to the operational characteristic.

The '120 patent application describes a suspension adjustment system which result in a properly adjusted initial spring pressure and corresponding spring rate, thereby making adjustment of the spring mechanism to a correct preset value, more convenient and automatic. However, such mechanisms and approaches as described may not monitor or determine the wear caused to the suspension system.

SUMMARY

The present summary is provided to introduce concepts related to estimating extent of wear of a suspension system in a vehicle. The concepts are further described below in the detailed description. This summary is not intended to identify essential features of the claimed subject matter nor is it intended for use in determining or limiting the scope of the claimed subject matter.

In one implementation, a method for estimating extent of wear of a suspension system is described. To this end, the method utilizes a computing device to perform all steps described below for estimating extent of wear of a suspension system. For implementing the wear extent estimation of the suspension system, baseline operational parameters of the suspension system are initially received over a communication channel. The baseline operational parameters may correspond to an unused or new suspension system. The vehicle behavior may depend on motion parameters of the vehicle. Therefore, when the vehicle is present in motion, the motion parameters of the vehicle are detected by one of the sensors of the computing device, which may be fixedly deployed within the vehicle. Once the motion parameters of the vehicle are detected, actual operational parameters may be estimated by the computing device based on the detected motion parameters. Once estimating the actual operational parameters of the suspension system, the actual operational parameters are periodically monitored, wherein the monitoring is to determine whether the actual operational parameters deviate from the baseline operational parameters. On determining the actual operational parameters deviating from the baseline operational parameters beyond a predefined threshold, an alert is generated to indicate the extent of wear of the suspension system. The alert is generated based on deviation to warn the driver of the vehicle about current state of the components of the suspension system.

Thus, utilizing the computing device to detect vehicle behavior and to perform the wear detection mechanism ensures that the driver is well informed or possibly warned about the extent of wear of the suspension system. Additionally, the computing device may measure all relevant and required parameters of the suspension system and the vehicle motion with the capability to store these parameters or broadcast these parameters to a second device as cloud or memory or any cluster of storage. Thus, an efficient wear extent estimation method is ensured, which may store the parameters for a longer time period.

The following detailed description references the drawings, wherein:

DETAILED DESCRIPTION

Figure 1:
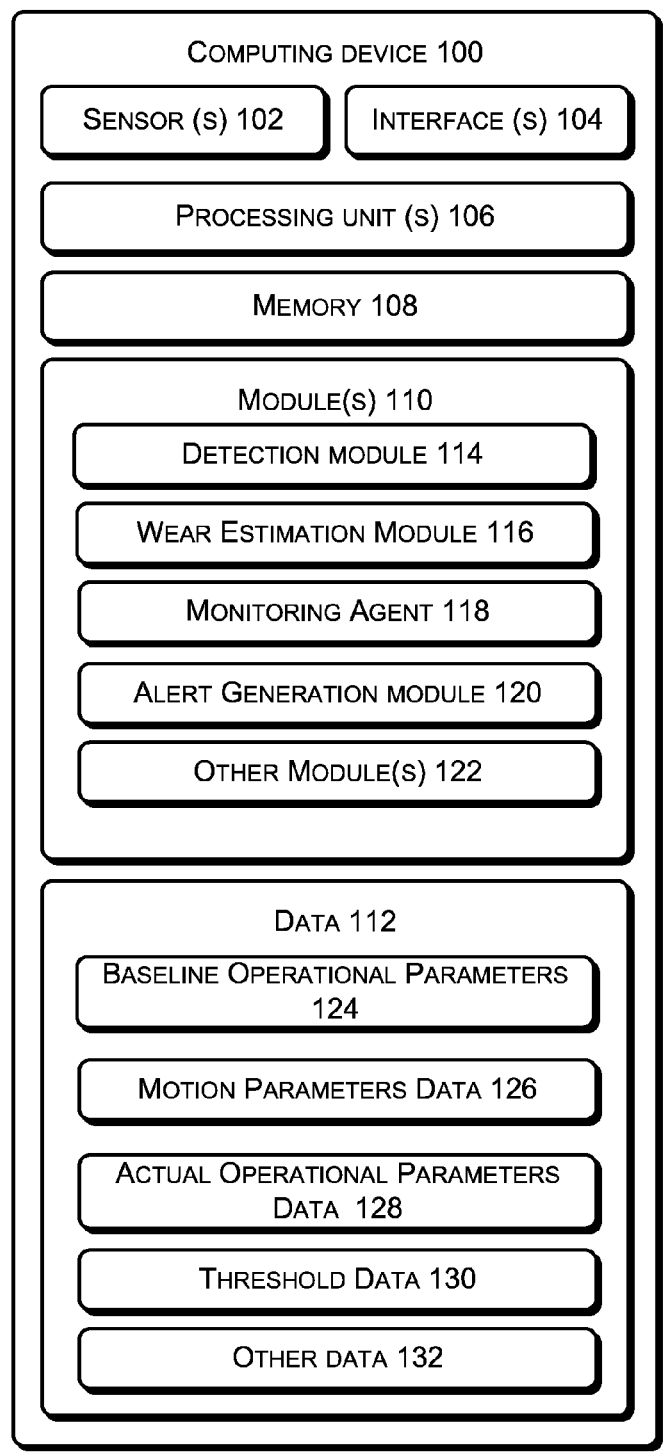
FIG. 1 is a block diagram of a computing device, as per an implementation of the present subject matter.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles and their components may be subject to normal wear during the course of their operational lifetime. Furthermore, certain conditions may aggravate the onset of the component wear. For example, erratic driving and regular improper handling of the vehicle may result in the wear occurring at a faster rate when compared to a case where the vehicle is handled in a proper manner. In either case, the component wear beyond a certain limit may compromise their functional and the structural stability and integrity.

Of the many systems present in a vehicle, the suspension system may be considered as being more prone to wear in comparison with the other components. The suspension system generally bears the mass or other loads of the vehicle, as a result of which the extent of wear which the suspension system experiences may be more when considered with respect to other systems. Furthermore, the manner in which the vehicle is operated may also impact the rate at which the wear occurs within the suspension system. For example, executing sharp turns at high speeds or sudden braking and accelerations tend to put additional stress on the suspension system, thereby aggravating the extent at which wear would become onset in a vehicle, when compared to vehicle which is generally driven in a proper manner.

To this end, approaches for suspension system wear detection in a vehicle using a computing device are described. Although reference is typically made to a suspension system, the term suspension system may also be considered as encompassing within its scope, elements or components which constitute the suspension system. Continuing with the explanation to the present subject matter, the computing device as discussed may include a plurality of sensors. Examples of such sensors include GPS, acceleration sensors or accelerometers, and gyroscopes. The computing device may include, but is not limited to a smart phone, tablet, phablet or like. For implementing wear extent detection of the suspension system, the computing device is initially fixedly, but temporarily, deployed inside the vehicle. In operation, for estimating extent of wear of a suspension system in a vehicle, baseline operational parameters of the suspension system are initially received. In one example, the baseline operational parameters may be received over a communication channel. The baseline operational parameters may be one of temperature, yaw, roll, noise, Eigen-frequency of different elements of the suspension system. The baseline operational parameters may be understood as being representative of conditions which correspond to an unused or new suspension system.

For estimating extent of wear of a suspension system in a vehicle, one or more motion parameters of the vehicle are detected. In the present implementation, the motion parameters are detected by the computing device while the vehicle is in motion. The motion parameters may correspond to the physical parameters which the vehicle may experience during the course of its motion. Examples of such motion parameters include forces exerted in the vehicle during to acceleration, deceleration, and centrifugal forces (due to turning of the vehicle). It should be noted that the examples of motion parameters are only illustrative; other examples of motion parameters would also be included within the scope of the present subject matter.

Once the motion parameters are determined, one or more actual operational parameters correlated with the motion parameters are estimated based on the determined motion parameters. The actual operational parameters may depict or correspond to the physical condition of the suspension system, at any instant of time. As would be understood, during the course of operation of the vehicle the actual operational parameters would vary with the changing condition of the suspension system. Furthermore, certain conditions such as excessive braking or other types of erratic driving may also be considered as having an impact on the rate at which wear of the suspension system occurs.

During the course of the vehicle usage, the estimated actual operational parameters are periodically monitored to determine the extent to which the operational parameters deviate from the baseline operational parameters of the suspension system. The monitoring of the actual operational parameters is implemented using the computing device. While monitoring, if the actual operational parameters deviate from the baseline parameters beyond a predefined threshold, the computing system may generate an alert indicating an extent of wear of the suspension system. In the present manner, the extent of the wear of the suspension system may be estimated and an alert may be provided to the user in time before the suspension system may be subject to permanent damage. As would be understood, the alert may serve as an indicator for the user to take the vehicle for a thorough inspection of the suspension system. Thereafter, appropriate repairs may be carried out. As a result, any problem in the suspension system is determined and addressed quickly. This overcomes the need for costly repairs, or for replacing the entire suspension system had the problems of suspension system been overlooked.

In continuation to the above example, for estimating extent of wear of a suspension system in a vehicle, the predefined threshold of wear may be defined as a wear identification band or range for the suspension system. The wear identification band may be defined as a set or range of values for the different operational parameters of the suspension system, within which the suspension system may be considered as functioning optimally, and therefore not requiring any repairs. On the other hand, if the operational parameters of the suspension system lie outside the wear identification band, then it may be concluded that the suspension system has reached a point where the suspension system has to be thoroughly inspected for determining whether repairs are to be carried out. For example, periodically the values of the temperature, yaw, roll, noise, Eigen-frequency of the components of the suspension system are determined whether they lie within or outside the wear identification band.

The monitoring of deviation of the actual operational parameters changing over time, allows a determination of a degradation of the suspension system over time. If the deviation is similar in all components of the suspension system and the deviation does not extend beyond the wear identification band, then a normal wear out process may be identified and the driver or any user may not be informed.

In another example, the rate of the normal wear if found to be higher than a predefined rate, may also be notified to the user by way of an alert even though the operational parameters of the suspension system may be within the limits of the wear identification band. In such a case, any sudden changes in the operational parameters, which in turn could be a result of structural damage to the suspension system, may be determined and the problem may be timely addressed.

In yet another example, if one or more components of the suspension system are replaced, the baseline operational parameters of the suspension system are recalibrated based on the baseline operational parameter of the one or more replaced component. Further, the recalibrated baseline operational parameters of the suspension system are received by the computing system over the communication channel.

In another implementation, the computing device may transmit data of the operational parameters to a central storage repository for persistent storage. The data may be communicated over a wired or a wireless medium. The data may subsequently be communicated to third parties capable of carrying out repairs to the suspension system. In such a case, based on review of the data the third party may actively get in touch with the use for scheduling the servicing of the suspension system.

The above mentioned implementations are further described herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1 is a block diagram of the computing device 100 for estimating extent of wear of a suspension system in a vehicle, as per an example of the present subject matter. In the present example, the computing device 100 (hereinafter referred to as the device 100) is fixedly deployed within the vehicle (not shown in the figure). For example, the device 100 may be temporarily fixed inside the vehicle in a holder or a stand. Thereafter, the device 100 may be removed for subsequent use. Returning to the present subject matter, the device 100 includes a plurality of sensors (collectively referred to as sensor(s) 102). Examples of such sensor(s) 102 include, but are not limited to, accelerometers, gyroscopes, rotational sensor, G-sensor, GPS-sensor, capacitive sensor, temperature sensor, and microphone.

Besides the sensor(s) 102, the device 100 further includes interface(s) 104 and processing unit(s) 106. The interface 104 may include a variety of interfaces, for example, interfaces for data input and output devices, referred to as I/O devices, storage devices, network devices, and the like, for detecting one or more operational parameters associated with a suspension system of the vehicle within which the device 100 is deployed. The interface(s) 104 also assist in communicatively associating the device 100 with other computing devices over a wired or a wireless medium.

The processing unit 106 can be a single processing unit or a number of units, all of which could include multiple computing units. The processing unit 106 may be implemented as one or more microprocessors, microcomputers, microcontrollers, digital signal processors, central processing units, state machines, logic circuitries, and/or any devices that manipulate signals, based on operational instructions.

Among other capabilities, the processing unit(s) 106 may fetch and execute computer-readable medium stored in memory 108. The memory 108 may be coupled to the processing unit 106 and may include any non-transitory machine-readable storage medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the device 100 may include module(s) 110 and data 112. The module(s) 110 and the data 112 may be coupled to the processing unit 106. The module(s) 110, amongst other things, can include routines, programs, objects, components, data structures, etc., which perform particular tasks or implement particular abstract data types. The modules 110 may also, be implemented as, signal processor(s), state machine(s), logic circuitries, and/or any other device or component that manipulate signals based on operational instructions.

In an implementation, the module(s) 110 include a detection module 114, a wear estimation module 116, a monitoring agent 118, an alert generating module 120, and other module(s) 122. The other module(s) 122 may include programs or coded instructions that supplement applications or functions performed by the system 100. Additionally, in the present example, the data 112 includes baseline operational parameters 124, motion parameters 126, actual operational parameters data 128, threshold data 130, and other data 132. The data 112, amongst other things, may serve as a repository for storing data that is processed, received, or generated, as a result of the execution of one or more modules. Although the data 112 is shown internal to the device 100, it may be understood that the data 112 can reside in an external repository, such as a remote storage (not shown in the figure), which may be operably coupled to the device 100 through a wired or wireless medium.

In operation, for estimating extent of wear of a suspension system in a vehicle, the detection module 114 receives baseline operational parameters 124 of the suspension system over a communication channel. The baseline operational parameters 124 of the suspension system may be related to physical parameters associated with the suspension system such as noise, temperature, Eigen-frequencies and yaw, to name a few. The baseline operational parameters 124 of the suspension system may correspond to a new vehicle or to a new suspension system deployed in the vehicle. The baseline operational parameters 124 of the suspension system may further correspond to one or more replaced components of the suspension system.

As would also be understood, the suspension system may undergo constant wear during the course of the vehicle's operation. During the operation as a result of the wear, the operational parameters of the vehicle may also undergo a constant change. It is to note that such operational parameters may be utilized by the device 100 for determining whether the suspension system is in need of repairs or not. This is to say that the operational parameters of a properly functioning suspension system would differ from the operation parameters of a suspension system which is in need of repairs.

Returning to the operation of the device 100, the device 100 may constantly monitor one or more motion parameters 126 of the vehicle. The motion parameters 126 of the vehicle, in the present example are determined using the sensor(s) 102. Examples of motion parameters 126 include but are not limited to forces exerted in the vehicle during to acceleration, deceleration, and centrifugal forces (due to turning of the vehicle). As mentioned previously, the sensor(s) 102 determine the motion parameters 126 of the vehicle. For example, sudden braking and accelerations of the vehicle may be determined by the sensor(s) 102, i.e., the accelerometers of the device 100. In another example, the microphone of the device 100 may be used for capturing sounds which may be emanating from the suspension system. The sounds emanating from the suspension system may be subsequently analyzed to determine corresponding Eigen frequencies of the suspension system.

As would also be understood the motion parameters 126 may be considered as determinative of the condition of the suspension system. For example, the sudden accelerations or braking, or initiating sharp turns may further exert additional strain on the suspension system of the vehicle. Such conditions may tend to increase the rate at which the suspension system may undergo wear. In the present example, the detection module 114 may detect the number of times such conditions are encountered. As would be understood, for a certain number of such occurrences some wear would follow for the suspension system.

Once the motion parameters 126 of the vehicle are detected, the wear estimation module 116 (referred to as the module 116) may estimate the actual operational parameters data 128, based on the detected motion parameters 126. For example, the module 116 may determine the number of times events corresponding to motion parameters 126 have occurred over a time window. Based on the number of occurrences of such events the module 116 may estimate the actual operational parameters data 128. In another example, the module 116 may also determine the actual operational parameters data 128 based on mileage of the vehicle under consideration.

The actual operational parameters data 128 may be determined based on a relational map. The relational map may correlate the motion parameters 126 with the actual operational parameters 128. Based on the measured value of the motion parameters 126, the module 116 may determine the associated actual operational parameters data 128.

Thereafter, the module 116 may obtain the received baseline operational parameters 124 of the suspension system. In one example, the baseline operational parameters 124 may be obtained from the memory 108. Once the baseline operational parameters 124 are obtained, the wear estimation module 116 compares the actual operational parameters data 128 with the baseline operational parameters 124, at periodic intervals. While comparing, the wear estimation module 116 may determine the extent of deviation of the actual operational parameters data 128 from the baseline operational parameters 124.

As would be understood, during the course of the vehicle usage, the suspension system may undergo wear. As the suspension system undergoes wear, actual operational parameters data 128 may tend to deviate from the baseline operational parameters 124. While monitoring, the monitoring agent 118 may determine whether the actual operational parameters data 128 have deviated from the baseline operational parameters 124 by a predefined threshold. On determining that the actual operational parameters data 128 to have deviated from the baseline operational parameters 124 by the predefined threshold, the monitoring agent 118 may initiate the alert generation module 120. On initiation, the alert generation module 120 may generate an alert to indicate that the suspension system may have undergone wear related damage, and certain servicing or repairs are required. Accordingly, the user may approach one or more third parties for repairing or servicing the suspension system of the vehicle.

In another example, the monitoring agent 118 may monitor the rate at which the actual operational parameters data 128 vary. As would be understood, the rate of normal wear may proceed at a certain rate. For example, the rate of normal wear may be dependent on the mileage of the vehicle. However, in some cases the rate at which the wear of the suspension system occurs may be more than the normal rate. This may occur in scenarios such as when the vehicle encounters an uneven bump on the road surface at high speeds. In such a case, the impact experienced due to the road bump may cause damage or an extended wear to the suspension system of the vehicle.

As a result, the rate at which the actual operational parameters data 128 varies would appear to have changed suddenly. The sudden changes in the actual operational parameters data 128 may be monitored by the monitoring agent 118. On ascertaining the occurrence of such sudden changes, the monitoring agent 118 may initiate the alert generation module 120 to generate an alert. In such a case, the alert may be generated by the alert generation module 120 despite the fact that the actual operational parameters data 128 may not have deviated from the baseline operational parameters 124. Once the alert is generated, the user may schedule an appointment for getting the suspension system checked, to determine whether any servicing or repairs are required.

In another example, the actual operational parameters data 128 may be communicated to a storage repository for persistent storage. The communication of the actual operational parameters data 128 may be affected through a wireless communication channel between the device 100 and the storage repository (not shown in FIG. 1). In yet another example, the actual operational parameters data 128 may be obtained by a third party, which may be responsible for carrying out the servicing and the repairs of the suspension system. Based on the deviation of the actual operational parameters data 128 from the baseline operational parameters 124, the third party may ascertain whether the suspension system requires any repairs or servicing, and may get in touch with the user for scheduling the repairs or servicing.

Figure 2:
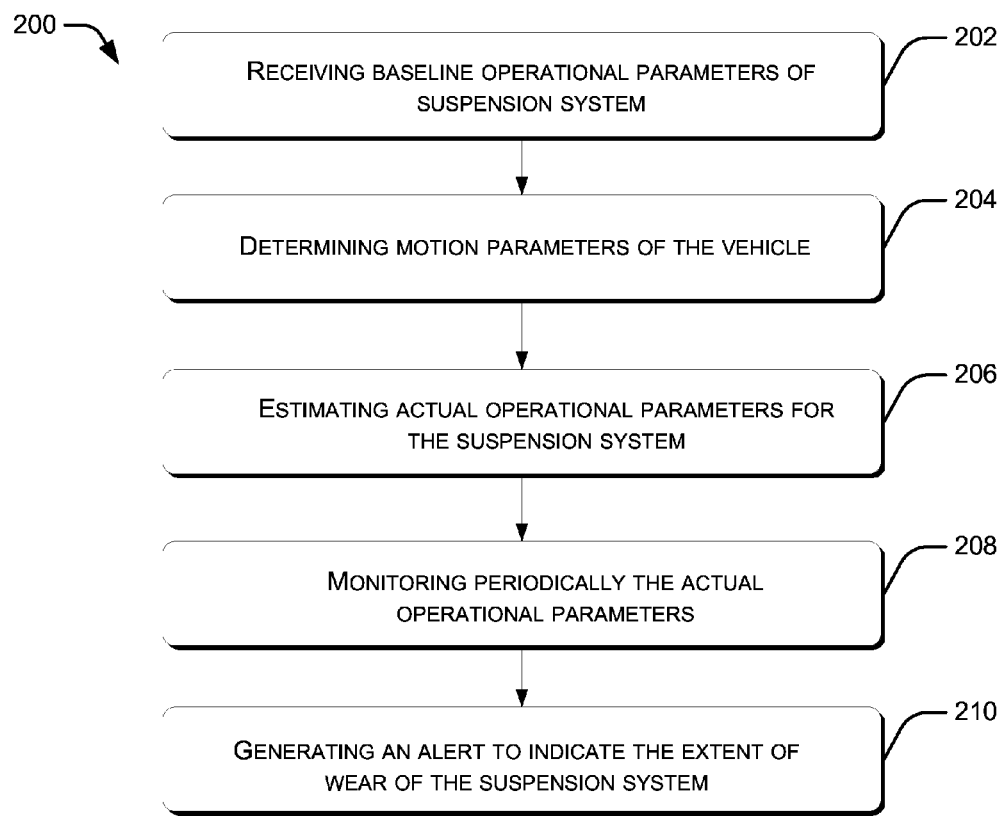
FIG. 2 is a flow chart of a method for estimating extent of wear of a suspension system in a vehicle, as per an implementation of the present subject matter.

FIG. 2 is a flow chart of a method for estimating extent of wear of a suspension system in the vehicle, as per an implementation of the present subject matter. The order in which the method is described is not intended to be construed as a limitation, and any number of the described method blocks may be combined in any order to implement the aforementioned methods, or an alternative method. Furthermore, method 200 may be implemented by processing resource or processing unit(s) through any suitable hardware, non-transitory machine-readable storage medium, or combination thereof.

It may also be understood that method 200 may be performed by the device 100 as depicted in FIG. 1. Furthermore, the method 200 may be executed based on instructions stored in a non-transitory machine-readable storage medium, as will be readily understood. The non-transitory machine-readable storage medium may include, for example, digital memories, magnetic storage media, such as one or more magnetic disks and magnetic tapes, hard drives, or optically readable digital data storage media. Although, the method 200 is described below with reference to the device 100 as described above, other suitable systems for the execution of these methods can be utilized. Additionally, implementation of these methods is not limited to such examples.

At block 202, baseline operational parameters of the suspension system may be received over a communication channel. For example, the detection module 114 receives the baseline operational parameters of the suspension system over the communication channel. The baseline operational parameters of the suspension system may correspond to the unused suspension system. The baseline operational parameters of the suspension system may also correspond to the one or more replaced component of the suspension system.

At block 204, motion parameters of the vehicle may be detected by the sensor(s) 102. The sensor(s) 102 may be implemented within the device 100 or may be implemented within the vehicle, and coupled to the device 100. The motion parameters of the vehicle are detected by one of the sensors of the computing device 100, which may be fixedly deployed within the vehicle, when the vehicle is present in motion. Further, additional parameters from the surrounding of the vehicle may be gathered using third party sources, which may affect the motion parameters of the vehicle.

At block 206, the actual operational parameters of the suspension system may be estimated by the wear estimation module 116, wherein the estimation may be based on the detected motion parameters. The actual operational parameters of the suspension system may define the real time state of the components of the suspension system. The actual operational parameters may depict or correspond to the physical condition of the suspension system, at any instant of time. As would be understood, during the course of operation of the vehicle the actual operational parameters would vary with the changing condition of the suspension system.

At block 208, the actual operational parameters may be periodically monitored by the monitoring agent 118. The monitoring agent 118 may periodically monitors whether the actual operational parameters are deviating from the baseline operational parameters of the suspension system. The deviation may be a function of state of the components of the suspension system. Incrementing deviation may be leading to incrementing extent of wear of the suspension system.

At block 210, an alert may be generated to indicate the extent of wear of the suspension system. For example, the alert generating module 120, on determining the deviation of the actual operational parameters from the baseline operational parameters beyond the predefined threshold, may generate the alert directing a communication to the driver of the vehicle to indicate the extent of wear of the suspension system. The alert generating module 120 may also generate the alert directing a communication to the third party service provider relating to the vehicle. Based on the alert, the driver or the third party service provider relating to the vehicle may get the information that the components of the suspension system might be worn out and a workshop should be consulted.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for estimating extent of wear of a suspension system in a vehicle, the method comprising:
   receiving baseline operational parameters of the suspension system over a communication channel that correspond to an unused suspension system;
   detecting motion parameters of the vehicle while the vehicle is in motion by a computing device fixedly deployed within the vehicle;
   estimating actual operational parameters for the suspension system based on the detected motion parameters;
   monitoring periodically to determine whether the actual operational parameters deviate from the baseline operational parameters of the suspension system; and
   in response to determining that the actual operational parameters deviate from the baseline operational parameters beyond a predefined threshold, generating an alert to indicate an extent of wear of the suspension system.

2. The method as claimed in claim 1, wherein the motion parameters are determined using at least one sensor of the computing device.

3. The method as claimed in claim 1, wherein the motion parameters include roll, pitch, heavy motion, accelerations, or braking pitch.

4. The method as claimed in claim 1, wherein the actual operation parameters include Eigen-frequencies, temperature, yaw, or pitch movement.

5. The method as claimed in claim 1 further comprising determining the extent of wear of the suspension system based on the actual operational parameters data.

6. The method as claimed in claim 1, wherein the generated alert is directed to a third party service provider relating to the vehicle.

7. The method as claimed in claim 1 further comprising, in response to the actual operational parameters varying at a rate greater than a predefined value, generating another alert.

8. An apparatus for a vehicle comprising:
   one or more processors configured to, in response to actual operational parameters of the vehicle, that correspond to a suspension system of the vehicle and that are derived from motion parameters of the vehicle sensed while the vehicle is moving, deviating from baseline operational parameters beyond respective predefined thresholds, generate an alert to indicate an extent of wear of the suspension system of the vehicle.

9. The apparatus of claim 8, wherein the one or more processors are further configured to, in response to the actual operational parameters varying at rates greater than respective predefined values, generate another alert.

10. The apparatus of claim 8, wherein the baseline operational parameters correspond to an unused suspension system.

11. The apparatus of claim 8, wherein the motion parameters include roll, pitch, heavy motion, accelerations, or braking pitch.

12. The apparatus of claim 8, wherein the actual operation parameters include Eigen-frequencies, temperature, yaw, or pitch movement.

13. A method for a vehicle comprising:
   by one or more processors,
      in response to actual operational parameters, that correspond to a suspension system of the vehicle and that are derived from motion parameters of the vehicle sensed while the vehicle is moving, varying at rates greater than respective predefined values, generate an alert to indicate an extent of wear of the suspension system of the vehicle.

14. The method of claim 13 further comprising, in response to the actual operational parameters of the vehicle deviating from baseline operational parameters, that correspond to an unused suspension system, beyond respective predefined thresholds, generating another alert.

15. The method of claim 13, wherein the motion parameters include roll, pitch, heavy motion, accelerations, or braking pitch.

16. The method of claim 13, wherein the actual operation parameters include Eigen-frequencies, temperature, yaw, or pitch movement.

* * * * *